United States Patent [19]

Tseng

[11] Patent Number: 5,384,460
[45] Date of Patent: Jan. 24, 1995

[54] ENCODER WITH A LIGHT EMITTING EDITING WHEEL

[75] Inventor: Dennis Tseng, 8F-6, No. 100, Sec. 2, Hoping E. Rd., Taipei, Taiwan, Prov. of China

[73] Assignees: Silitek Corporation; Dennis Tseng, Taipei, Taiwan, Prov. of China

[21] Appl. No.: 145,213

[22] Filed: Nov. 3, 1993

[51] Int. Cl.[6] ............................................. G01D 5/34
[52] U.S. Cl. ........................... 250/231.14; 345/165; 345/166; 250/227.31
[58] Field of Search ............... 345/163, 164, 165, 166, 345/167, 157, 156, 158, 184; 250/227.31, 231.13, 213.14

[56] References Cited

U.S. PATENT DOCUMENTS

| | | | |
|---|---|---|---|
| 3,304,434 | 2/1967 | Koster | 345/165 |
| 4,906,843 | 3/1990 | Jones et al. | 345/163 |
| 4,982,618 | 1/1991 | Culver | 345/167 |
| 5,168,268 | 12/1992 | Levy | 345/165 |

Primary Examiner—Alvin E. Oberley
Assistant Examiner—Xiao M. Wu
Attorney, Agent, or Firm—Browdy and Neimark

[57] ABSTRACT

An encoder with a light emitted editing wheel comprises an editing wheel defines a wheel body and a hole in its middle portion. The editing wheel is made from transparent material, such glass, acrylic etc. The editing wheel is mounted on a shaft member and can be actuated to rotate thereon via suitable actuating means. A plurality of light focusing means being disposed along the circumference of the editing wheel. A light receiving means is provided radially on the wheel body. The light focusing means is interconnected with the light receiving means and capable of focusing a light source transmitted from the light receiving means into a plurality of light point. A light source is disposed at a perpendicular position above the editing wheel. The light source is capable of sending a light to the light receiving means of the editing wheel. And a sensor means is disposed adjacent to the light focusing means. A pair of light detecting means are provided at the sensor means thereon. The light detecting means is capable of sending an active signal as a light point is received thereon.

13 Claims, 9 Drawing Sheets

ENCODER WITH A LIGHT EMITTING EDITING WHEEL

BACKGROUND OF THE INVENTION

This invention relates to an editing wheel and, more particularly, to an encoder with a light emitted editing wheel for controlling the movement of the cursor on the monitor of a PC assembly.

Even though the keyboard has incorporated with direction keys, up, down, left and right, for moving the cursor on the monitor, it is still not enough. Of course the direction keys can meet its designed function in a word processor package, but in some package, such as CAD/CAM, the moving speed of the cursor actuated by the direction keys is too slow to meet the requirements for executing the command. In light of this, a mouse is created to move the cursor. The introduction of the mouse really solves the problem and it can move the cursor on the monitor quickly.

In general, the mouse includes a housing incorporated with a pair encoders. Each encoder comprises two light sources, an editing wheel, two sensors and an actuating ball. Said editing wheel includes a plurality of slits disposed angularly in said editing wheel. Each slit is spaced apart by an opaque portion which has the same width as said slit. By this arrangement, the light emitted from said light source will be detected (represented by 1) by said sensor when the light passes through said slit or the light emitted from said light source will be shuttered (represented by 0) when the light is blocked by said opaque portion as said editing wheel is rotated by said actuating ball. Since this editing wheel is disposed between said light source and said sensor, on the other hand, their is a special arrangement between the width of the slit, the angle difference between two sensors, as long as said editing wheel is moved by the actuating ball, a pair of serial logic signals, (11, 10, 00, 01), are generated. By this provision, the cursor on the monitor can be moved easily by the mouse in any direction/position easily and efficiently. When the editing wheel rotates clockwise, a repeated serial signals (11, 10, 00, 01, 11, 10, 00, 01, ...) are generated, if the editing wheel rotates counterclockwise, another repeated signals (01, 00, 10, 11, 01, 00, 10, 11, ...) will be generated either. These signals then are used to move the cursor in one direction. Another encoder assembly will provide the same serial signals to move the cursor in another direction.

The accuracy/resolution, represented by Dot Per Inch, DPI, of the cursor is determined by the number of the slit disposed on said editing wheel. Theoretically, the more slits there are, the more accuracy the mouse is. But, the more the slits are, the narrow the angle between two slits. If the angle between two slits exceed the lower limit, a problem of diffusion will happen if the diameter of the editing wheel does not increase accordingly. For example, the distance between two detecting chips incorporated on a sensor is 0.94 mm, in each open and close of said slit and said opaque portion, the ration of the distance of the opaque and the distance between two chips is 4:3. If the diameter of the editing wheel is seven (7), then the number of the slits is fifteen (15), the formula will be described detailed later. When the number of the slit exceeds fifteen (15), then a problem of diffusion will happen. This means even the opaque portion is set between said detecting chip and said light source, the light will pass from two slits adjacent from said opaque portion. In light of this, no mater which direction the editing wheel rotates, the detecting wheel detects the light always. Then the serial signals generated will remain same (11, 11, 11, ...). The circuity can not analysis this signals and cause a malfunction of the mouse.

SUMMARY OF THE INVENTION

It is the object of this invention to provide an encoder which provides more accuracy/resolution while avoid the problem of diffusion.

It is still the object of this invention to provide an encoder wherein light is transmitted to said light detecting means via an editing means.

It is still the object of this invention to provide an encoder wherein the light is focused into a light point before it reaches the light detecting means.

In order to achieve the objects set forth, the encoder made according to this invention comprises an editing wheel defines a wheel body and a hole in its middle portion. Said editing wheel is made from transparent material, such glass, acrylic etc. Said editing wheel is mounted on a shaft member and can be actuated to rotate thereon via suitable actuating means. A plurality of light focusing means being disposed along the circumference of said editing wheel. A light receiving means is provided radially on said wheel body. Said light focusing means is interconnected with said light receiving means and capable of focusing a light source transmitted from said light receiving means into a plurality of light point. A light source is disposed at a perpendicular position above said editing wheel. Said light source is capable of sending a light to said light receiving means of said editing wheel. And a sensor means is disposed adjacent to said light focusing means. A pair of light detecting means are provided at said sensor means thereon. Said light detecting means is capable of sending an active signal as a light point is received thereon.

In one of a preferable embodiment of this encoder, said light receiving means includes a plurality of receiving cells disposed radially on said editing wheel. Each of said receiving cells is aligned with said light focusing means.

In one of the preferable embodiment of this encoder, a light source is disposed in the center of the editing wheel.

BRIEF DESCRIPTION OF THE DRAWINGS

The structural and operational characteristics of the present invention and its advantages as compared to the known state of the prior art will be better understood from the following description, relating to the attached drawings which show illustratively but not restrictively an example of an encoder with a light emitted editing wheel. In the drawings.

DETAILED DESCRIPTION OF THE PREFERABLE EMBODIMENTS

Figure 1:
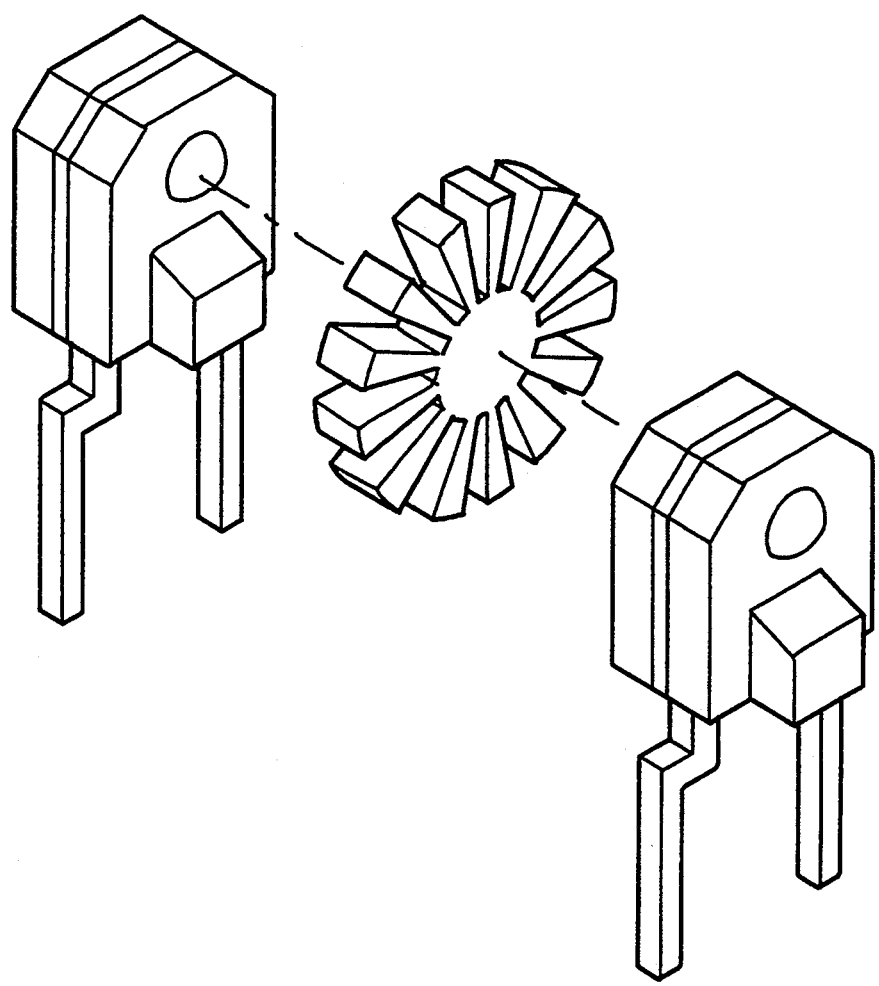
FIG. 1 is a perspective view of a conventional encoder.
Figure 2:
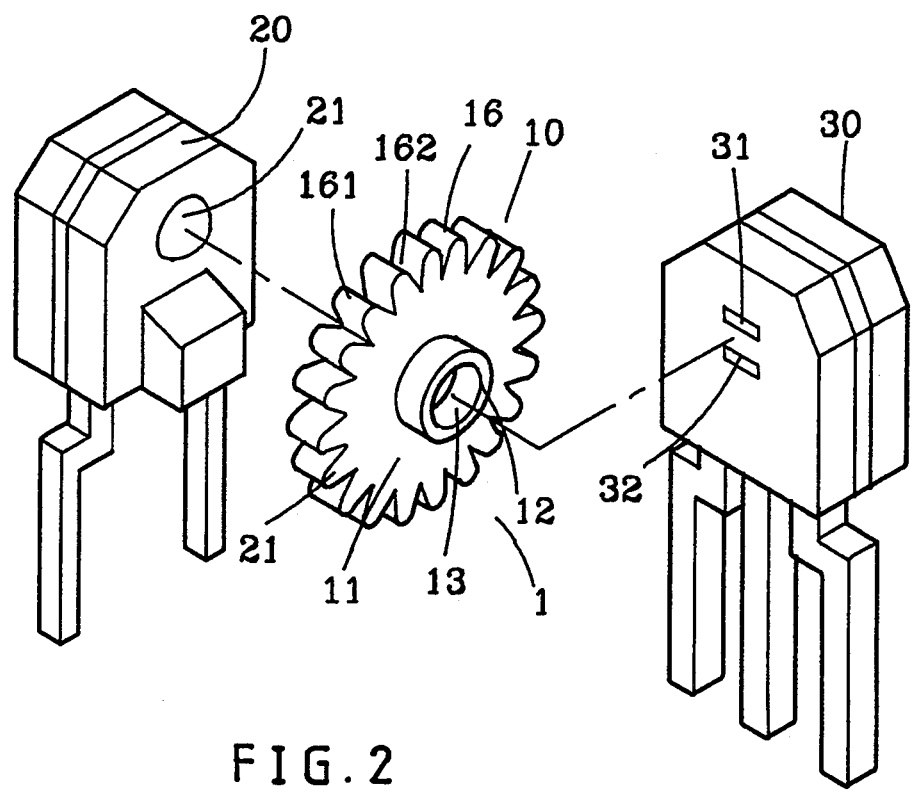
FIG. 2 is a perspective view of an encoder incorporated with a light emitting editing wheel made according to this invention.

Referring to FIG. 2, the encoder 1 made according to this invention comprises an editing wheel 10, a light source 20 and a light detecting means 30. The direction of the light from said light source 20 is perpendicular to said editing wheel 10 and said light detecting means 30 is disposed in the radial direction of said editing wheel 10. Said light source 20 has a LED 21 which emits light to said editing wheel 10. Said light detecting means 30 includes a first sensing chip 31 and a second sensing chip 32.

Figure 3A:
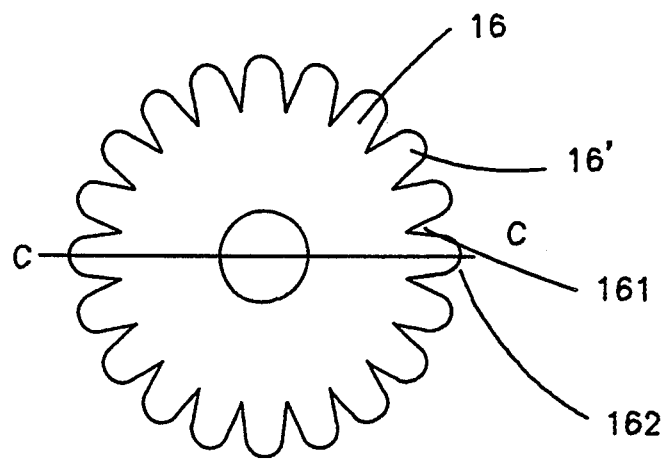
FIG. 3a is a top plan view of a first embodiment of an encoder incorporated with a light emitting editing wheel made according to this invention.
Figure 3B:
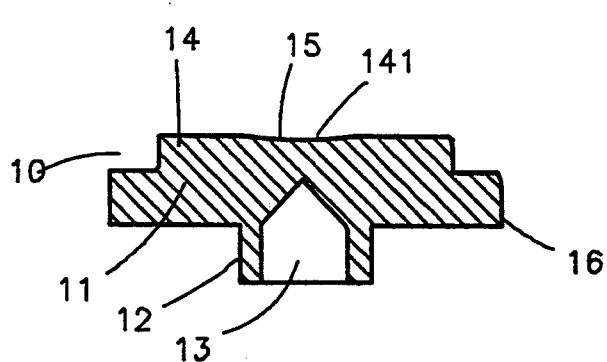
FIG. 3b is a cross sectional view of a first embodiment of an encoder incorporated with a light emitting editing wheel made according to this invention.
Figure 3C:
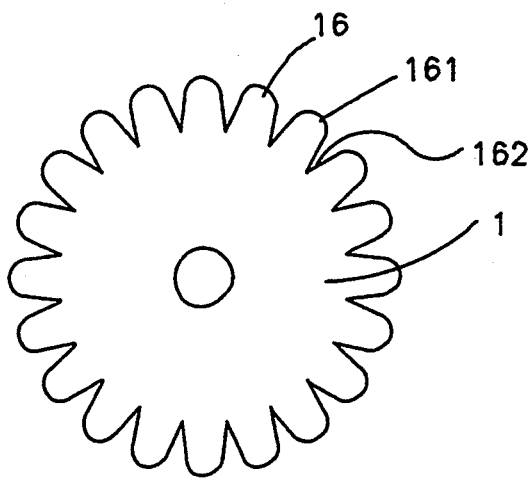
FIG. 3c is a bottom plan view of a first embodiment of an encoder incorporated with a light emitting editing wheel made according to this invention.

Referring to FIG. 3a, 3b and 3c, the first embodiment of an encoder incorporated with a light emitting editing wheel made according to this invention. This encoder 1 comprises an editing wheel 10 defines a wheel body 11 and a cylindrical tube 12 defining cone 13 therein. The editing wheel 10 is made from transparent material, such glass, acrylic etc. The editing wheel 10 can be mounted on a shaft member (not shown in Figures) and can be actuated to rotate thereon via suitable actuating means. Said wheel body 11 further includes a disk portion 17 at the other side opposite to said cylindrical tube 12. Said disk portion 17 has a recessed portion 14 at its center and defines a lens 15 jointly together with said cone 13 of said cylindrical tube 12. There are a plurality of light focusing means 16 along the circumference of said wheel body 11. Each of said light focusing means 16 has a round head portion 161 capable of focusing light into a light point. Every two adjacent light focusing means 16 are spaced by a valley 162. When a light is emitted from said light source 20 and into said editing wheel 10, by the function of said lens 15 and said cone 13, said light will be dispensed within said wheel body 11. By the focusing effect provided by said light focusing means 16, said light will become a plurality of light points emitted from said light focusing means 16. These light points can be detected by said first sensing chip 31 and said second sensing chip 32 of said light detecting means 30.

Referring to FIGS. 3d-3f and 6, a consecutive view showing the operation of a first embodiment of an encoder incorporated with a light emitting editing wheel made according to this invention. The distance between two adjacent light focusing means 16, 16' is larger than the distance between said first sensing chip 31 and said second sensing chip 32 of said light detecting means 30. On the other hand, each light point has an effective area, by this arrangement, so that said wheel body 11 rotates clockwise, a series of light points with a predetermined span pass said first sensing chip 31 and said second sensing chip 32, generating a repeated series of signals (11, 10, 00, 01).

Figure 3D:
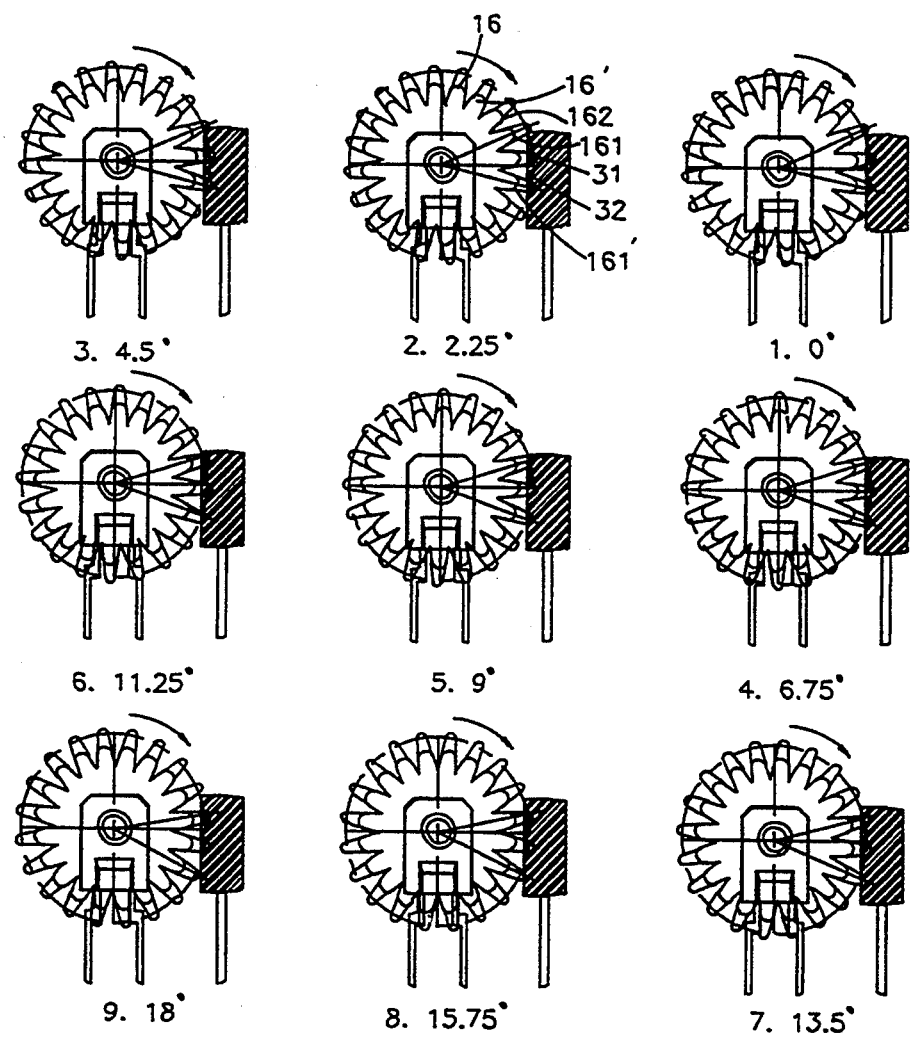
FIGS. 3d-3f are sketch view showing the operation of a first embodiment of an encoder incorporated with a light emitting editing wheel made according to this invention.
Figure 3E:
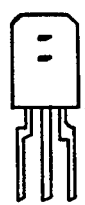
Figure 3F:

As shown in FIGS. 3d-3f, in the angle of zero, said first sensing chip 31 senses a lighted area and said second sensing chip 32 is in shadow area, then the signal is (0,1); at the angle is 2.25, the signal is (1,0); at the angle of 4.5, the signal is (1,0); at the angle of 6.75, the signal is (0,0); at the angle of 9, the signal is (0,0); at the angle of 11.25, the signal is (0,1); at the angle of 13.5, the signal is (0,1); at the angle of 15.75, the signal is (0,1); and at the angle of 18, the signal is (1,1).

Figure 6:
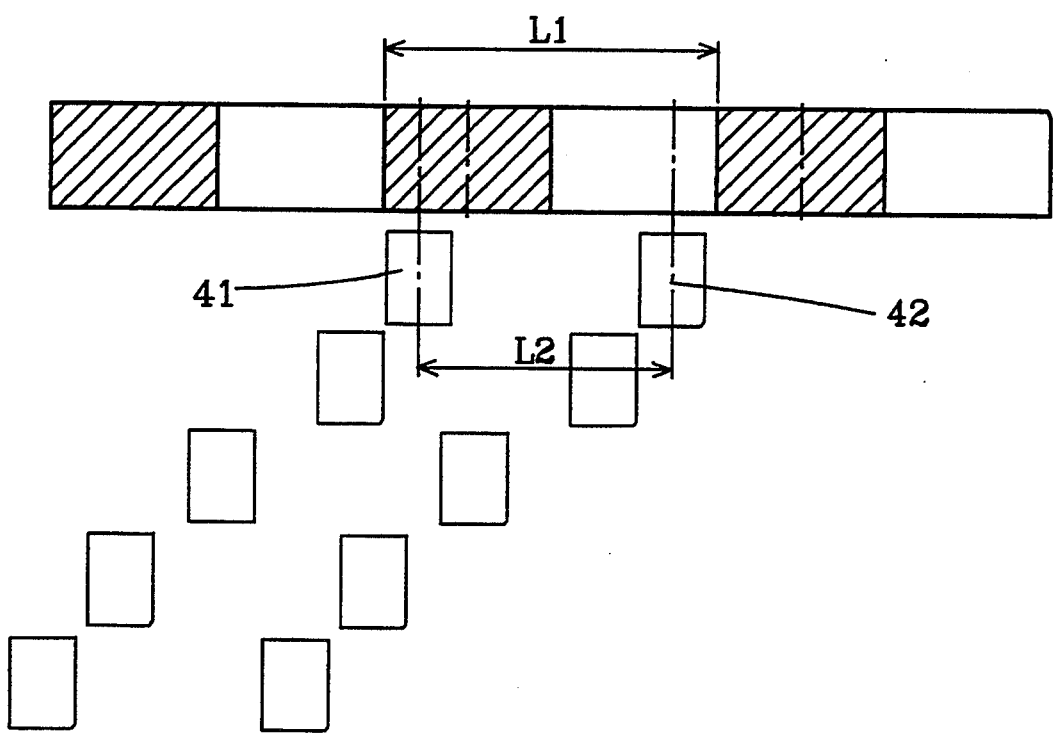
FIG. 6 is an arrangement between said light focus means and said light detecting chip.
Figure 7:
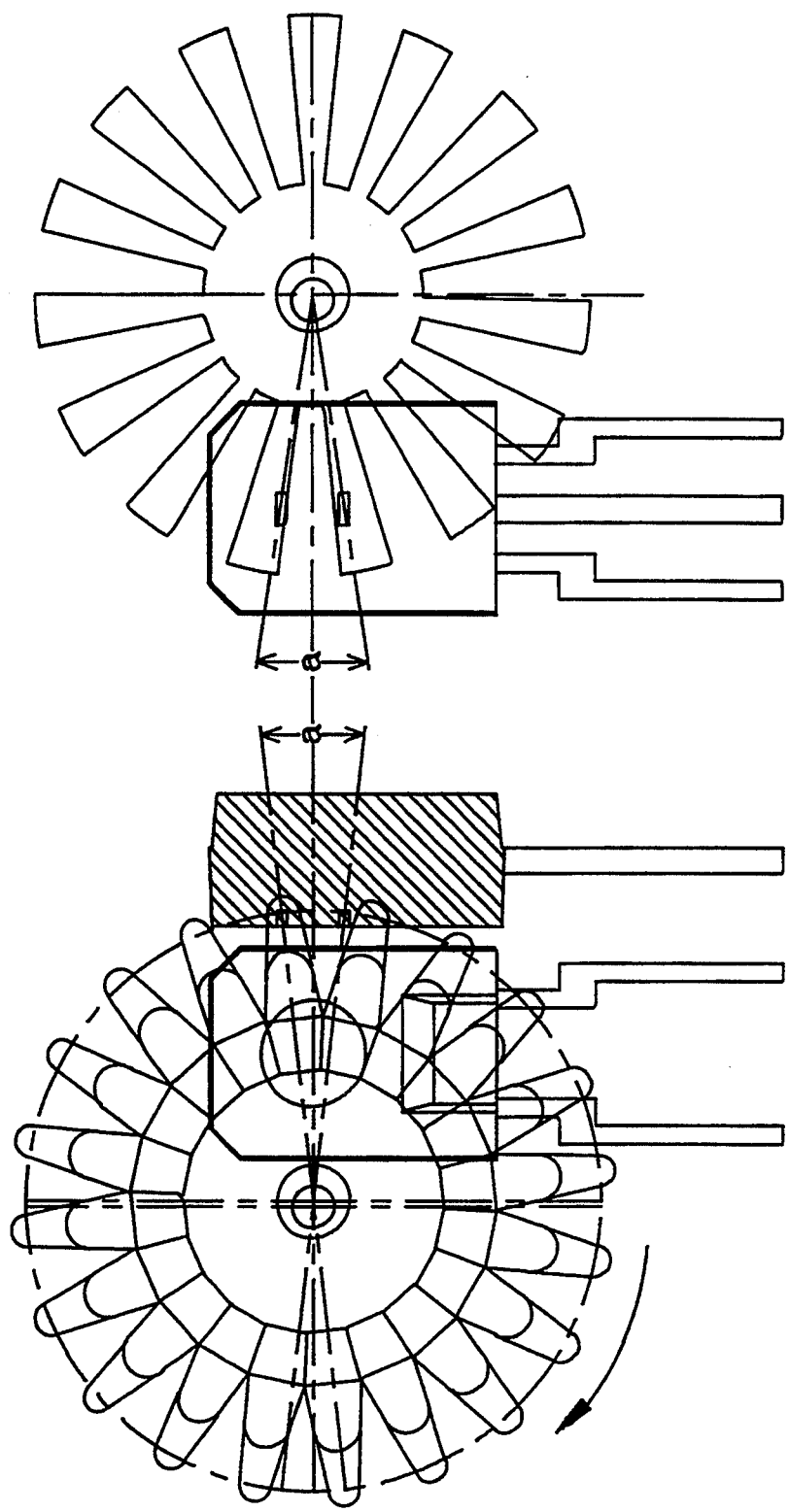
FIG. 7 is a plan view showing the operation between the editing wheel and said sensor.

The larger the number of the light focusing means 16 are, the higher the accuracy/resolution of the mouse. In analysis the signal generated by the encoder made according to this invention, such as shown in FIG. 6, some parameter are defined for analysis. The distance between two sensing chip 31, 32 is represented by L2, and the distance between two light focusing means 16, 16' is represented by L1. The ratio between L2 and L1 is 3:4. As shown in FIG. 7, the number of the light focus means 16 is represented by N, which is equal to the total light points generated in every revolution. The angle between two adjacent light focusing means 16, 16' is represented by A. The distance between the center of said sensing chip 31 to the center of said wheel body 11 is represented by r. The angle between said two sensing chip 31, 32 is a. Then the following formula can be achieved.

$$N = 360/A \quad A = 360/N$$

$$L2: L1 = a: A = 3:4 \quad a = 3A/4 \quad a = 270/N \qquad (1)$$

$$a/2 = \sin^{-1}(L2/2r)$$

$$a = 2\sin^{-1}(L2/2r) \qquad (2)$$

From (1) and (2), we get $$N = 135/\sin^{-1}(L2/2r)$$

Given the diameter of said wheel body 11 is 7 millimeters and L2 is 0.94 millimeters. For a conventional wheel body such as shown in FIGS. 2a and 2b:

r=7/2−distance of two sensing chip/2=3.5−0.8/4=3.1

Input this value to (2), $$N = 135/\sin^{-1}(0.94/6.2) = 15.48 = [15]$$

In the present invention, $$2r = 7 + (0.5 \times 2) = 8 \text{ mm}$$

Input this value into (2)

$$N = 135/\sin^{-1}(0.94/8) = 20.01 = [20]$$

From the above description, we understand the maximum number of slits is fifteen (15) before diffusion happens. But with the same diameter of the wheel body 11, the maximum number of the light focusing means 16 is twenty (20). We can find that the accuracy of a conventional encoder is 75% of the encoder made according to this invention. From formula (2), we understand the distance, L2, between two sensing chip shall be decreased to increase the resolution. The diameter of the conventional wheel body shall be decrease as well. If the diameter exceeds the lower limit, the problem of diffusion will happen, then only (1,1) signal will be generated. But, in the present invention, by focusing the light source into said wheel body 11, and then dispensing it into each and every light focusing means 16, the limit of diffusion can be easily exceeded and the resolution is upgraded by 25%.

In a preferable embodiment of this invention, head portion 161 of said light focusing means 16 has a rectangular shape to send a rectangular light point to said two sensing chip 31, 32.

Figure 4A:
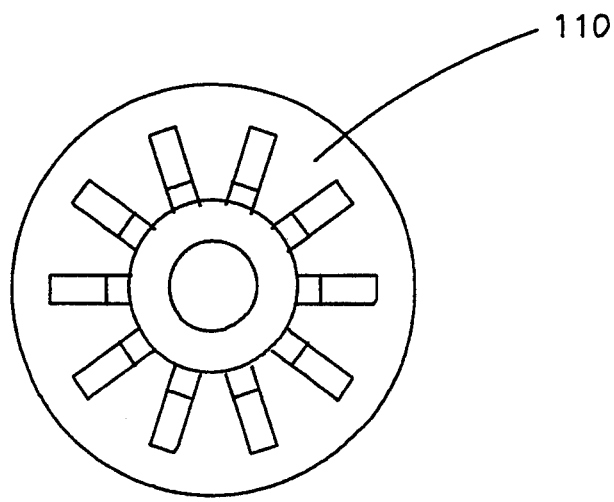
FIG. 4a is a top plan view of a second embodiment of an encoder incorporated with a light emitting editing wheel made according to this invention.
Figure 4B:
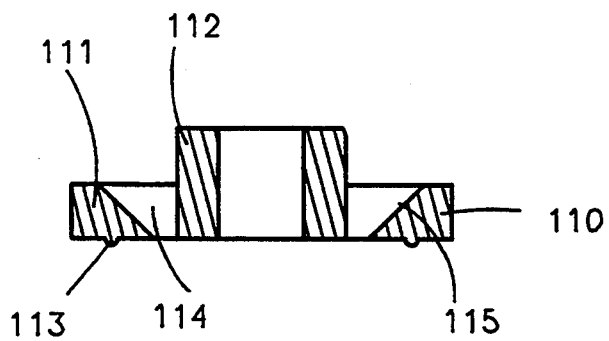
FIG. 4b is a cross sectional view of a second embodiment of an encoder incorporated with a light emitting editing wheel made according to this invention.
Figure 4C:
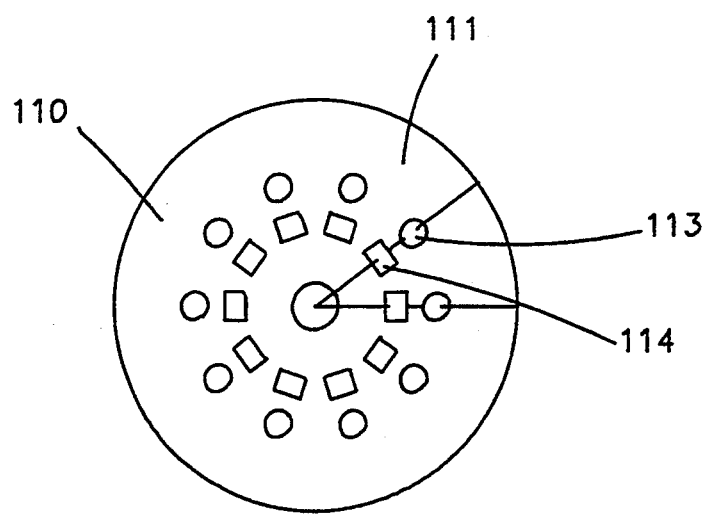
FIG. 4c is a bottom plan view of a second embodiment of an encoder incorporated with a light emitting editing wheel made according to this invention.
Figure 4D:
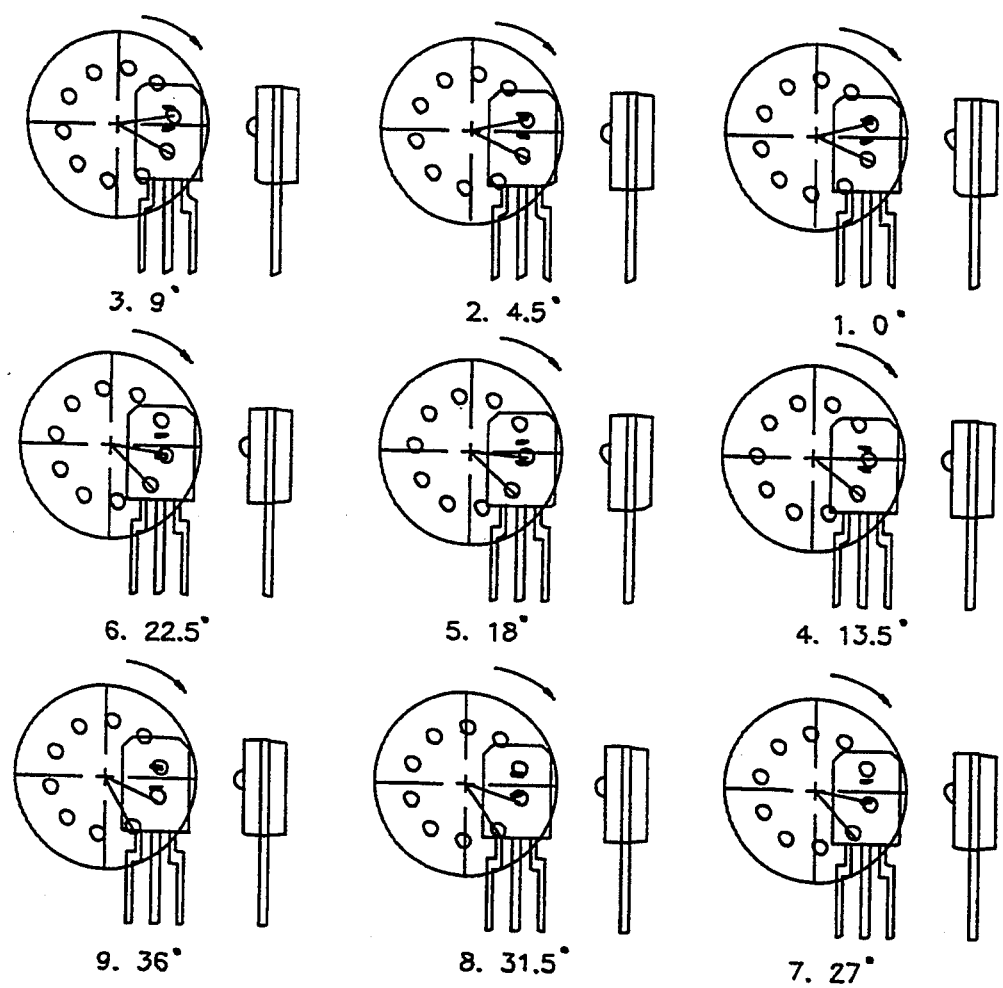
FIGS. 4d-4e are sketch view showing the operation of a second embodiment of an encoder incorporated with a light emitting editing wheel made according to this invention.
Figure 4E:
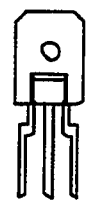
Figure 5A:
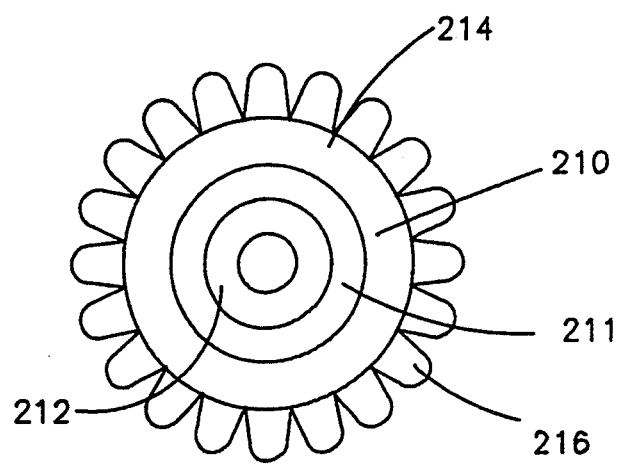
FIG. 5a is a top plan view of a third embodiment of an encoder incorporated with a light emitting editing wheel made according to this invention.
Figure 5B:
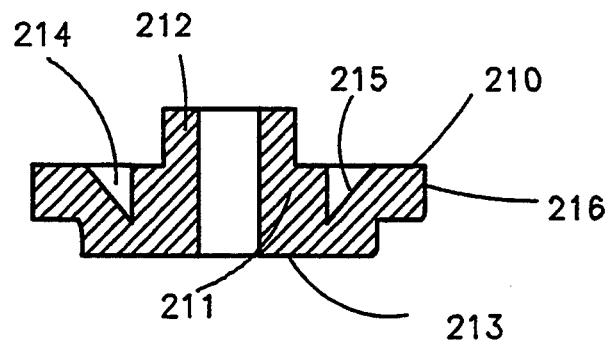
FIG. 5b is a cross sectional view of a third embodiment of an encoder incorporated with a light emitting editing wheel made according to this invention.
Figure 5C:
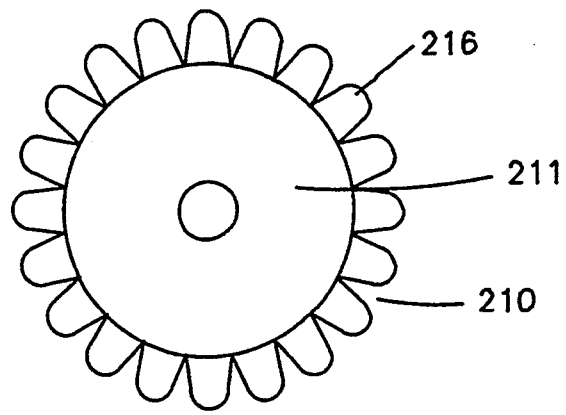
FIG. 5c is a bottom plan view of a third embodiment of an encoder incorporated with a light emitting editing wheel made according to this invention.
Figure 5D:
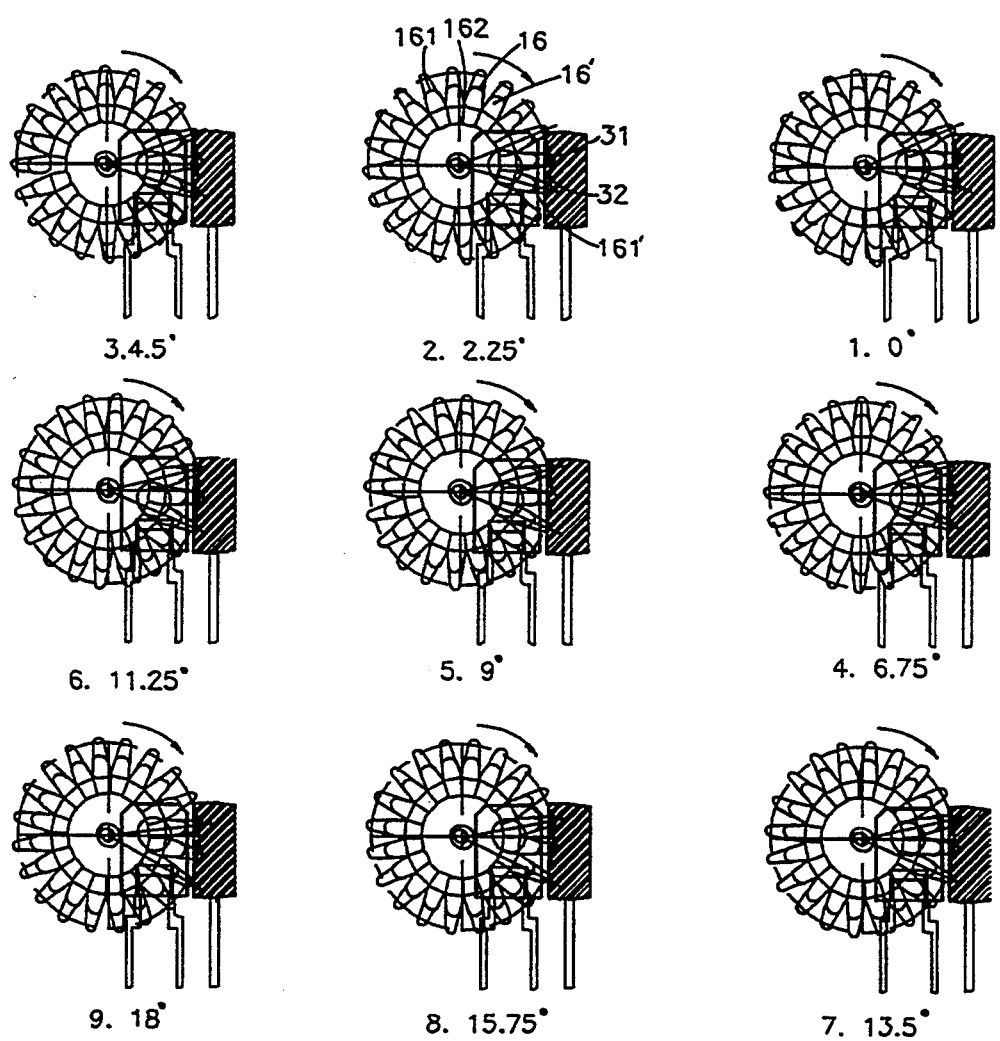
FIGS. 5d-5f are sketch view showing the operation of a first embodiment of an encoder incorporated with a light emitting editing wheel made according to this invention.
Figure 5E:
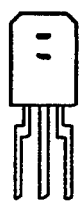
Figure 5F:

Referring to FIG. 4a, 4b and 4c, the second embodiment of an encoder incorporated with a light emitting editing wheel made according to this invention. Said editing wheel 110 defines a wheel body 111 and a cylindrical tube 112 in the center. The editing wheel 110 is made from transparent material, such glass, acrylic etc. The editing wheel 110 can be mounted on a shaft member (not shown in Figures) and can be actuated to rotate thereon via suitable actuating means. A plurality of lens 113 are provided at the underside of said wheel body 111 for receiving and focusing light into said wheel body 111. A plurality of undercut 114 having a trapezoid section are provided radially on said wheel body 111. Said inclined surface 115 is aimed outward for reflecting a received light to the periphery of said wheel body 111. Since this wheel body 111 are provided with a plurality of light focusing means 116 at its circumference as the first embodiment shown in FIG. 3, the same effect can be achieved by the embodiment provision shown in FIGS. 4a-4d.

In the third embodiment of this invention, said editing wheel 210 defines a wheel body 211 and a cylindrical tube 212 in the center portion. The editing wheel 210 is made from transparent material, such glass, acrylic etc. The editing wheel 210 can be mounted on a shaft member (not shown in Figures) and can be actuated to rotate thereon via suitable actuating means. Said wheel body 211 further includes a disk portion 213 at the other side opposite to said cylindrical tube 212. A plurality of light focusing means 216 along the circumference of said wheel body 211. Each of said light focusing means 216 has a round head portion 161 capable of focusing light into a light point or other shape capable of focusing an effective lighted area. An annual recessed portion 214 having a triangle cross section is provided radially on said wheel body 211. The inclined surface 215 of said recessed portion 214 is toward said light focusing means 216. By this arrangement, a plurality of light points can be generated by this wheel body 211 as a light source is received.

While this above described embodiment is based on the encoder applied on a mouse, it can be understood that the encoder provided by this invention can be applied to any encoding device, such as scanner and tracing ball.

Although the present invention has been described in connection with preferred embodiments thereof, many other variations and modifications will now become apparent to those skilled in the art without departing from the scope of the invention. It is preferred, therefore, that the present invention not be limited by the specific disclosure herein, but only by the appended claims.

I claim:

1. An encoder with a light emitting editing wheel, comprising
    an editing wheel defining a wheel body and a hole in its middle, said editing wheel being mounted on a shaft member and being actuated to rotate thereon via suitable transmission means, a plurality of light focusing means being disposed along the circumference of said editing wheel, a light receiving means being provided radially on said wheel body, said light focusing means being interconnected with said light receiving means to focus light transmitted from said light receiving means into a plurality of light points;
    a light source disposed at a perpendicular position above said editing wheel, said light source sending said light to said light receiving means of said editing wheel; and
    a sensor means being disposed adjacent to said light focusing means, a pair of light detecting means being provided at said sensor means thereon, said light detecting means being capable of sending an active signal as a light point of said plurality of light points is received thereon.

2. An encoder as recited in claim 1, wherein said light receiving means is a cone portion disposed at the center of said editing wheel.

3. An encoder as recited in claim 1, wherein said light receiving means includes a plurality of undercuts having a trapezoid cross section disposed radially on said editing wheel.

4. An encoder as recited in claim 3, wherein an inclined surface of each of said undercuts is aimed toward a periphery of said wheel body.

5. An encoder as recited in claim 1, wherein said light receiving means is an annular recessed portion having a triangular cross section disposed radially on said wheel body.

6. An encoder as recited in claim 1, wherein said light focus means has a round head portion.

7. An encoder as recited in claim 1, wherein said light focus means has a rectangular head portion.

8. An encoder as recited in claim 1, wherein said editing wheel is made from a transparent material, such as acrylic or glass.

9. An encoder as recited in claim 1, wherein said light source is disposed at a position which is perpendicular to said editing wheel.

10. An encoder with a light emitting editing wheel, comprising an editing wheel defining a wheel body, said editing wheel being mounted on a shaft member and being actuated to rotate thereon via suitable transmission means, a plurality of light focusing means being disposed along the circumference of said editing wheel, a light receiving means being provided radially on said wheel body, said light focusing means being interconnected with said light receiving means to light focus transmitted from said light receiving means into a plurality of light points;

a light source disposed at the center of said wheel body, said light source sending said light to said light receiving means of said editing wheel; and a sensor means being disposed adjacent to said light focusing means, a pair of light detecting means being provided at said sensor means thereon, said light detecting means being capable of sending an active signal as a light point of said plurality of light points is received thereon.

11. An encoder as recited in claim 10, wherein said light focus means has a round head portion.

12. An encoder as recited in claim 10, wherein said light focus means has a rectangular head portion.

13. An encoder as recited in claim 10, wherein said editing wheel is made from a transparent material, such as acrylic or glass.

* * * * *